United States Patent [19]

Herd et al.

[11] Patent Number: 5,428,141

[45] Date of Patent: * Jun. 27, 1995

[54] AZO DYESTUFFS CONTAINING FLUOROTRIAZINYL AND VINYLSULFONYLMETHYL-TYPE REACTIVE GROUPS

[75] Inventors: Karl-Josef Herd, Odenthal-Holz; Thomas Eizenhöfer, Cologne; Wolfgang Harms, Odenthal; Manfred Hoppe, Kuerten; Wolfram Reddig, Bergisch Gladbach, all of Germany

[73] Assignee: Bayer Aktiengesellschaft, Leverkusen, Germany

[*] Notice: The portion of the term of this patent subsequent to May 30, 2012 has been disclaimed.

[21] Appl. No.: 982,171

[22] Filed: Nov. 24, 1992

[30] Foreign Application Priority Data

Dec. 5, 1991 [DE] Germany .................. 41 40 117.4
Dec. 9, 1991 [DE] Germany .................. 41 40 541.2
Feb. 6, 1992 [DE] Germany .................. 42 03 279.2
Feb. 10, 1992 [DE] Germany .................. 42 03 794.8

[51] Int. Cl.$^6$ .................. C09B 62/08; C09B 62/507; D06P 1/38
[52] U.S. Cl. .................. 534/638; 534/632; 534/637
[58] Field of Search .................. 534/632, 637, 638

[56] References Cited

U.S. PATENT DOCUMENTS

| | | | |
|---|---|---|---|
| 4,730,038 | 3/1988 | Meininger et al. | 534/637 |
| 5,021,558 | 6/1991 | Buch | 534/638 X |
| 5,075,428 | 12/1991 | Jäger | 534/637 |

FOREIGN PATENT DOCUMENTS

| | | | |
|---|---|---|---|
| 0065732 | 12/1982 | European Pat. Off. | |
| 0079562 | 5/1983 | European Pat. Off. | |
| 0085025 | 8/1983 | European Pat. Off. | |
| 0085654 | 8/1983 | European Pat. Off. | |
| 0094055 | 11/1983 | European Pat. Off. | |
| 0307817 | 3/1989 | European Pat. Off. | |
| 0356681 | 3/1990 | European Pat. Off. | |
| 46-41432 | 12/1971 | Japan | 534/638 |
| 9109914 | 7/1991 | WIPO | |

OTHER PUBLICATIONS

Abstract of JP 91-055513 (Aug. 1991).
Abstract of JP 1-104,661 (Apr. 1989).
Abstract of JP 92-10508 (Feb. 1992).
Abstract of JP 92-24391 (Apr. 1992).

*Primary Examiner*—Mary C. Lee
*Assistant Examiner*—Fiona T. Powers
*Attorney, Agent, or Firm*—Sprung Horn Kramer & Woods

[57] ABSTRACT

Reactive dyestuffs which, as the free acid, have the following formula

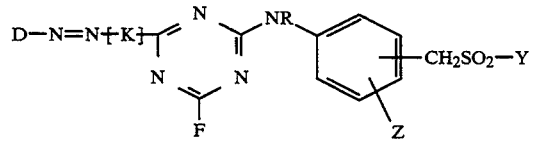

in which
K is

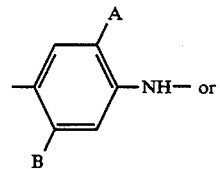

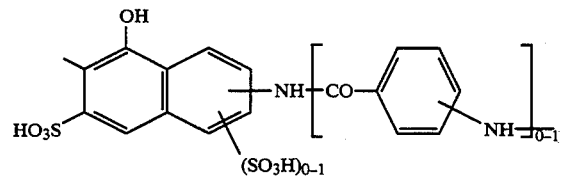

the bonding to the triazinyl radical taking place in each case via the amino function of K, and the remaining substituents have the meaning given in the description, are suitable in particular for the dyeing and printing of natural and synthetic OH- and/or amido-containing materials.

8 Claims, No Drawings

AZO DYESTUFFS CONTAINING FLUOROTRIAZINYL AND VINYLSULFONYLMETHYL-TYPE REACTIVE GROUPS

The invention relates to new azo reactive dyestuffs containing a monofluorotriazinyl and vinylsulphonyl reactive radical. It is true that combinations of reactive components are disclosed in EP-A-94,055, EP-A-85,025, EP-A-65,732, US-A-4,730,038 and EP-A-307,817, but this prior art still presents problems in terms of practical application.

The present invention relates to mono and disazo reactive dyestuffs which, as the free acid, have the formula (1)

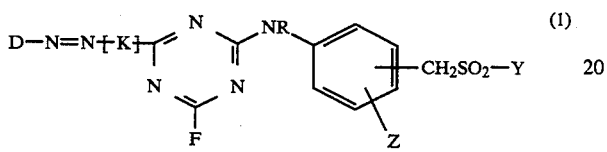

in which
- Y denotes $CH=CH_2$, $CH_2CH_2OSO_3H$ or $CH_2CH_2Cl$,
- R denotes H or $C_1-C_3$-alkyl, which may be substituted by OH, $CO_2H$ or CN, in particular $CH_3$, $C_2H_5$, $C_3H_7$, $CH_2CH_2OH$, $CH_2CH_2CO_2H$, $CH_2CO_2H$ or $CH_2CH_2CN$,
- Z denotes H, $C_1-C_4$-alkyl or $C_1-C_4$-alkoxy, in particular $CH_3$, $C_2H_5$, $OCH_3$, $OC_2H_5$ or $OC_3H_7$, and
- D denotes a phenyl or naphthyl radical substituted by $SO_3H$, $CO_2H$, $CH_2-SO_2W$, $SO_2W$, NH—$COCH_3$, $C_1-C_4$-alkyl and/or $C_1-C_4$-alkoxy, W having one of the meanings given under Y, or denotes a radical of the structure ![Structure with (HO3S)1-2 phenyl-N=N-phenyl with SO3H and (H,CH3)]

K denotes

![Structure with phenyl, A, NH—, B substituents]

the bonding to the triazinyl radical taking place in each case via the amino function of K,
- A denotes H, $C_1-C_4$-alkyl or $C_1-C_4$-alkoxy,
- B denotes H, $C_1-C_4$-alkyl, halogen, $C_1-C_4$-alkoxy, OH—, $SO_3H$- or $OSO_3H$-substituted $C_1-C_4$-alkyl, $NHCONH_2$, NHCO-(-$C_1-C_4$-alkyl), $NHCOCH_2OSO_3H$, NHCO-($-CH_2-)_{1-3}SO_3H$, $NHCOCH_2OH$ or NHCO-(-O-$C_1-C_4$-alkyl).

Preferred representatives of the formula (1) in which K is

![Naphthol structure with OH, HO3S, (SO3H)0-1, NH—CO—phenyl—NH]0-1]

are dyestuffs of the formula (2)

![Formula (2): (HO3S)1-2—[D]—N=N-naphthol-NH-triazinyl(F)-NR-phenyl-CH2SO2Y with Z substituent, HO3S, (SO3H)0-1]

in which
R, Y and Z have the abovementioned meaning and the phenyl or naphthyl radical D can be additionally substituted by $C_1-C_4$-alkyl, $C_1-C_4$-alkoxy, $NHCOCH_3$, $CH_2SO_2W$ or $SO_2W$, W having one of the meanings given under Y.

Particular preference is given to dyestuffs, in particular, of the formula (2) in which D represents a radical of the formula (3) and (4).

![Formula (3): naphthalene with SO3H, (HO2C,HO3S) substituents]

![Formula (4): phenyl with SO3H, (HO3S)0-1, (H,CH3,OCH3,OC2H5,NHCOCH3)]

Particular preference is also given to dyestuffs of the formula (5) and (6)

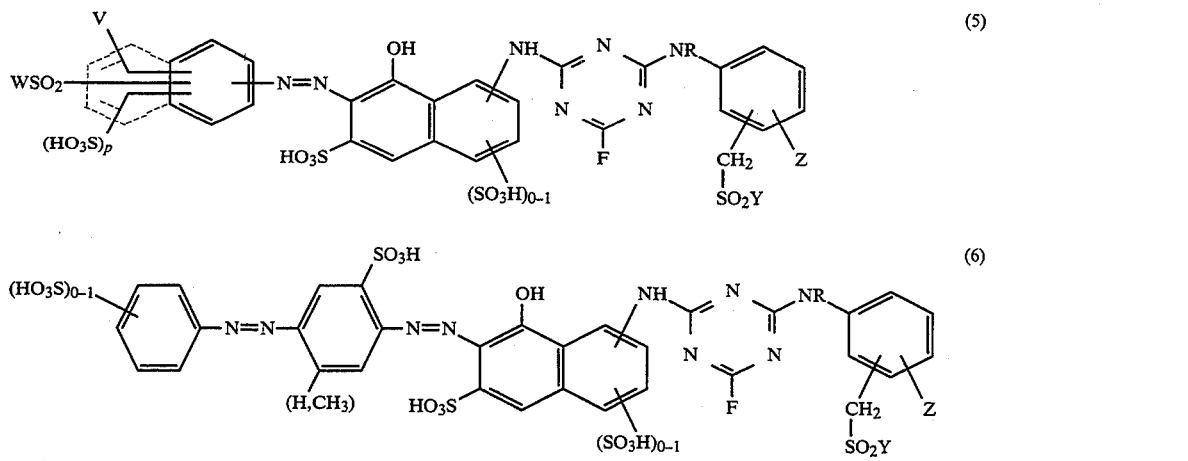

in which
V denotes H, CH₃, OCH₃, OC₂H₅ or NHAcyl, in particular NH—CO—CH₃,
p,m, independently of one another, denote 0 or 1,
R denotes H or C₂H₅,
W,Y, independently of one another, denote CH=CH₂ or CH₂CH₂OSO₃H, and
Z denotes H, CH₃ or OCH₃

Very particular preference is given to dyestuffs of the formula (7) and (8)

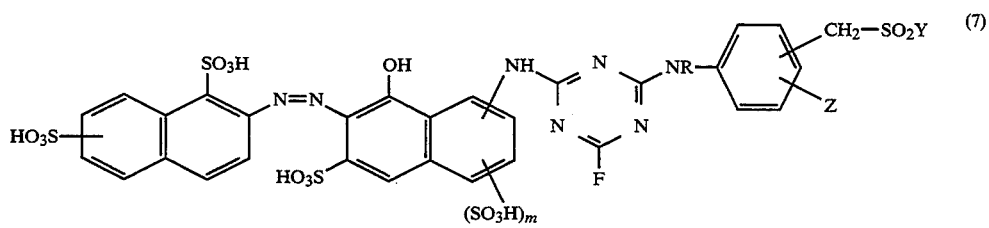

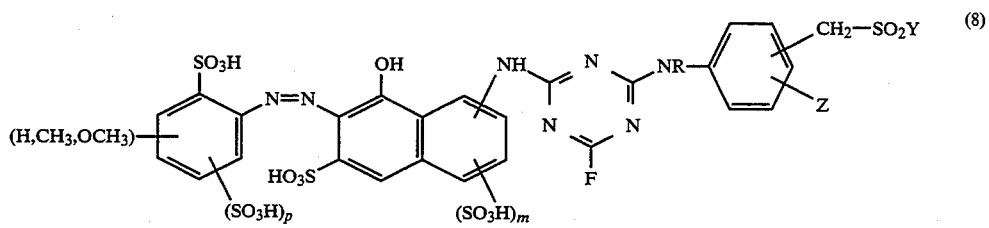

in which
p,m, independently of one another, denote 0 or 1,
R denotes H or C₂H₅,
Y denotes CH=CH₂ or CH₂CH₂OSO₃H, and
Z denotes H, CH₃ or OCH₃.

Preferred representatives of the formula (1) in which K is

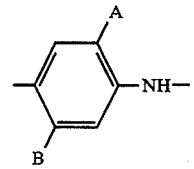

are dyestuffs of the formula (9)

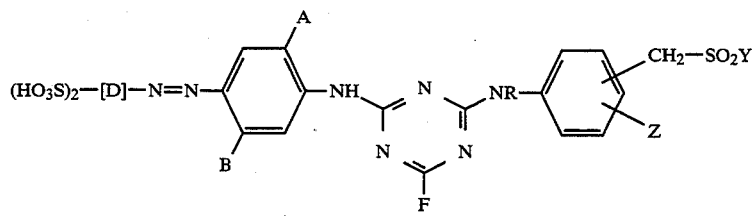

in which
A, B, R, Y and Z have the meanings mentioned for formula (1).

The phenyl or naphthyl radical D can be additionally substituted by C₁–C₄-alkyl, C₁–C₄-alkoxy, NHCOCH₃, CH₂SO₂W or SO₂W.

Particular preference is given to dyestuffs of the formulae (10) and (11)

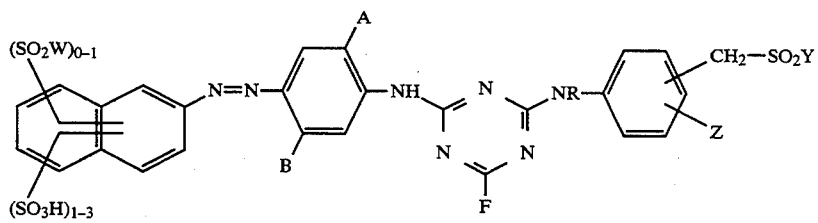

(10)

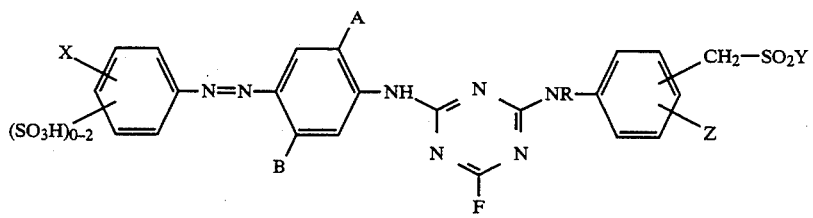

(11)

in which
X denotes H, CH₃, OCH₃, OC₂H₅, CH₂SO₂W or SO₂W, and

Diazotisation of amines D-NH₂ and coupling of the resulting diazonium compounds to aminonaphtholsulphonic acid derivatives of the formula (12).

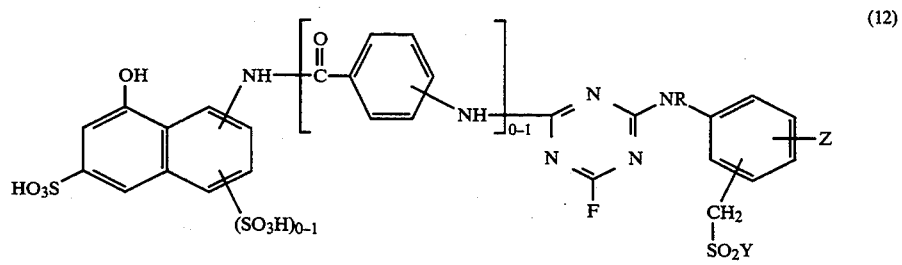

(12)

A, B, R, W and Z have the meanings given for formula (1), B in formula (10) representing in particular H, CH₃, $C_1$-$C_4$-alkoxy, NH—CO-($C_1$-$C_4$-alkyl), NHCOCH₂OH, NHCOCH₂OSO₃H or NHCO(—CH₂)₁₋₃-SO₃H.

Very particular preference is given to dyestuffs of the formula (10) and (11) in which
A is H,
B is NHCOCH₃, NHCONH₂ or NHCOCH₂OSO₃H, in formula (10) in particular CH₃, OCH₃, NHCOCH₃ or NHCOCH₂OSO₃H,
R is H or C₂H₅,
W,Y, independently of one another, are CH=CH₂ or CH₂CH₂OSO₃H, and
Z is H, CH₃ or OCH₃.

Formulae (1) to (11) represent the sulpho-containing dyestuffs in the form of free acids. In general, the preparation gives the salts, in particular the alkali metal salts, such as sodium salts, potassium salts or lithium salts. The dyestuffs can be obtained and used as powders or as concentrated aqueous solutions.

Preparation of the dyestuffs (1) in which K is

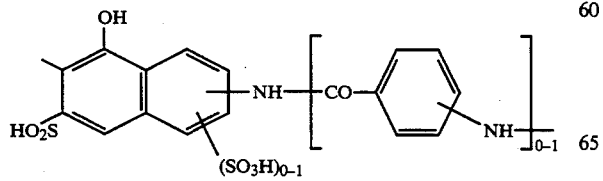

is carried out, for example, by the following procedure:

The intermediates (12) are prepared, for example, condensing aminonaphtholmono- or -disulphonic acids or (aminobenzoyl)aminonaphtholmono- or -disulphonic acids at the amine function by known methods (for example EP-A-40,806, DE-A-2,711,150, EP-A-172,790 or DE-A-2,747,014) with trifluoro-s-triazine and reacting the difluorotriazinyl compounds obtained with amines of the formula (13)

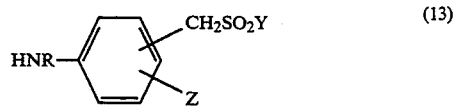

(13)

in the presence of acid-binding agents. Details of further possibilities of synthesis can be seen from Examples 1–93. Examples of aminonaphtholsulphonic acids are:

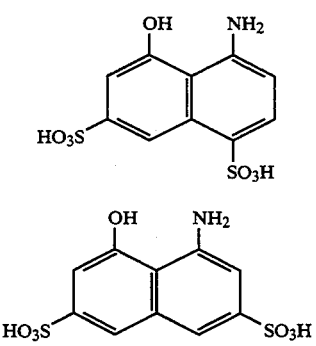

-continued
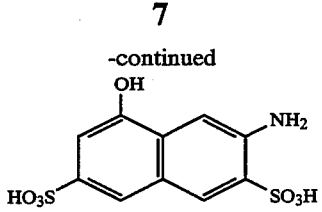
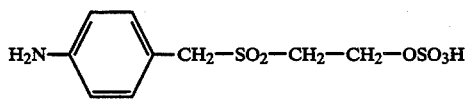
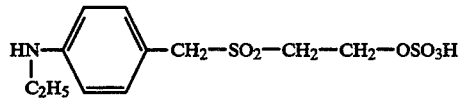
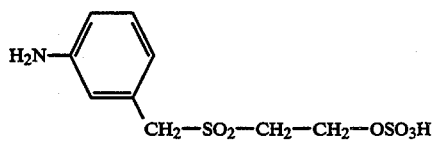
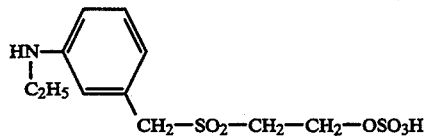
Examples of suitable amines of the formula (13) are:
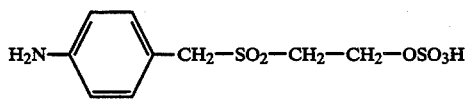
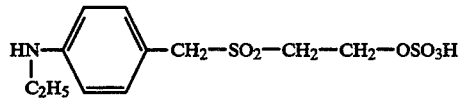
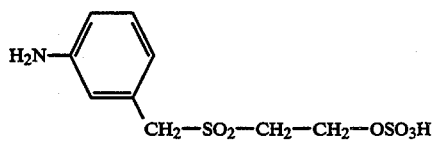
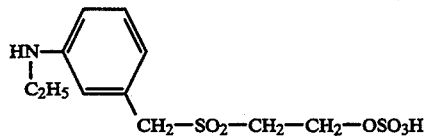
-continued
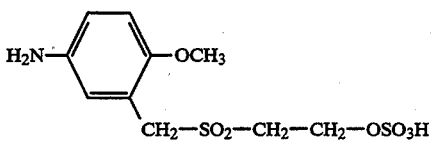
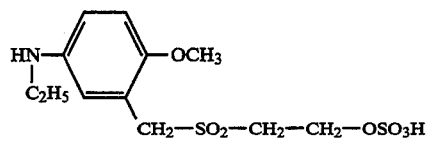
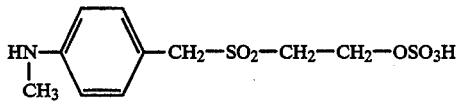
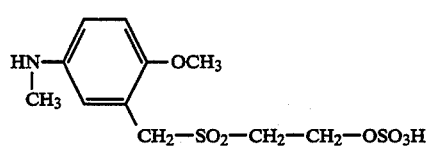
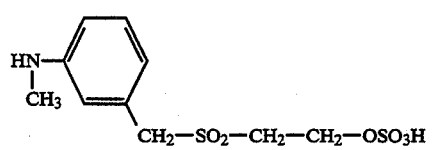
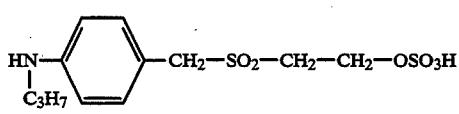
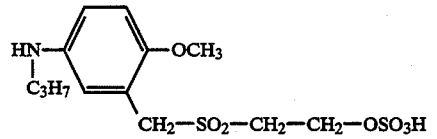
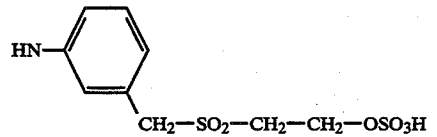
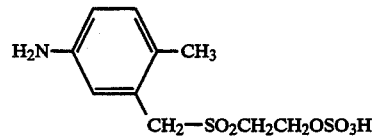
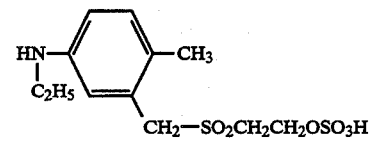
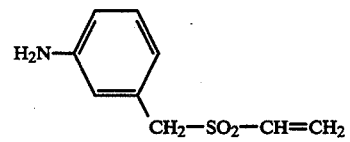

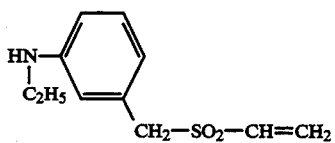

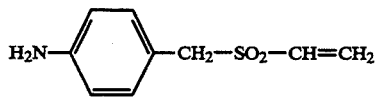

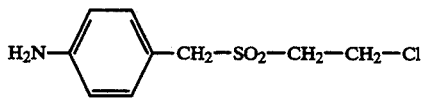

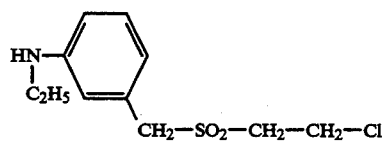

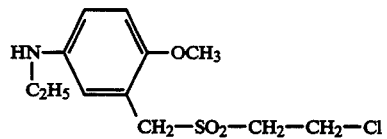

Preparation of the dyestuffs (1) in which K is

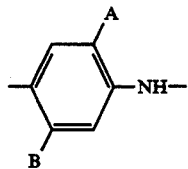

is carried out, for example, by the following procedure:
1. By condensation of trifluoro-s-triazine with a dyestuff base of the formula (14)

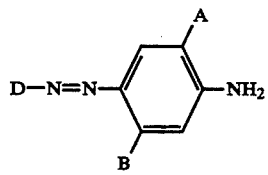

in the presence of acid-binding agents, followed by a second condensation of the resulting difluorotriazine compounds of the formula (15)

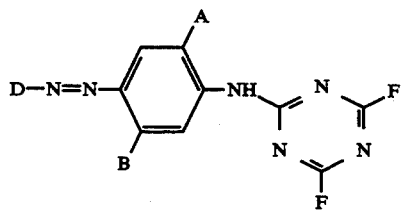

with amino compounds of the formula (13)

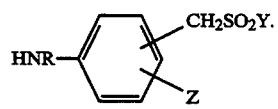

2. By condensation of trifluoro-s-triazine with amino compounds of the formula (13) in the presence of acid-binding agents, followed by a second condensation of the resulting difluorotriazine compound of the formula (16)

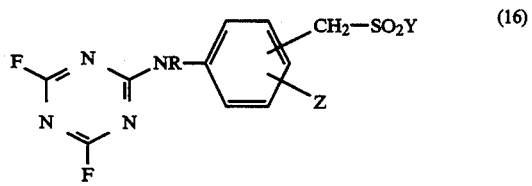

with dyestuff bases of the formula (14).
Examples of dyestuff bases (14) include:

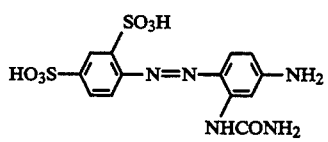

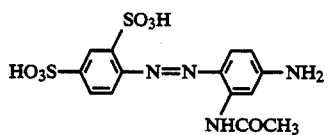

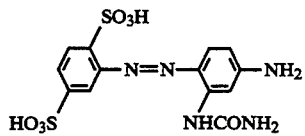

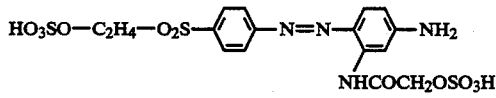

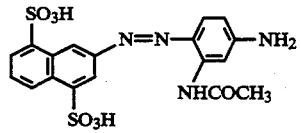

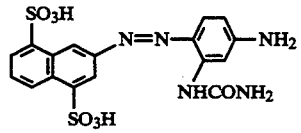

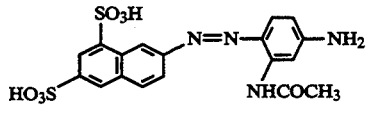

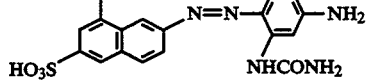

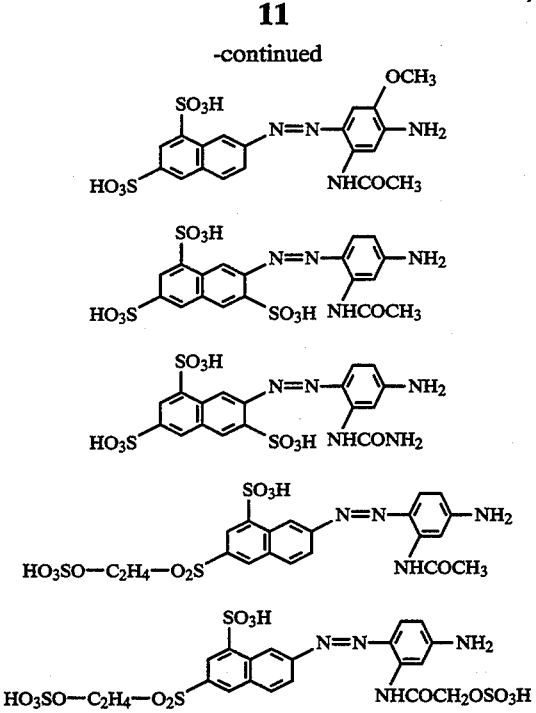

Suitable amines of the formula (13) have already been mentioned above by way of example.

The dyestuffs according to the invention are highly suitable for the dyeing and printing of natural and synthetic OH- and/or amido-containing materials, in particular those made of cellulose and polyamides. They are particularly suitable for the dyeing of cellulose materials, such as cotton or staple viscose, by the exhaust and cold pad-batch methods.

The dyestuffs can be used in a mixture with other dyestuffs for trichromatic dyeing.

Dyeings having good general fastness properties, in particular wetfastness properties, are obtained in combination with good build-up properties and high fixation yields.

EXAMPLE 1

0.1 mol of the amino compound of the formula

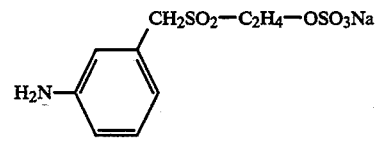

is stirred and dissolved in 100 ml of water and 100 g of ice. After addition of 0.1 mol of sodium bicarbonate, 0.11 mol of trifluoro-s-triazine are added dropwise at 0° C. over a period of 10 minutes. About 250 ml of an aqueous solution of the condensation product of the formula

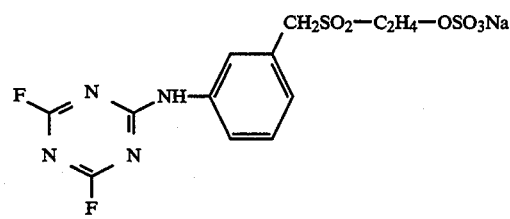

are obtained.

EXAMPLE 2

0.1 mol of 4-amino-5-hydroxy-2,7-naphthalenedisulphonic acid is suspended in 150 ml of water and dissolved under neutral conditions using a 10% strength lithium hydroxide solution. The above condensation solution (Example 1) is then added, and the pH is simultaneously maintained between 4.0 and 4.5 by addition of lithium carbonate. The second condensation is complete after about 6 hours at 10 to 20° C.

0.1 mol of 2-amino-1,5-naphthalenedisulphonic acid is diazotised in a known manner, and the resulting diazonium salt mixture is added to the solution of the coupling component at pH 6.5-7.5 at 20° C. Isolation and drying give about 45 g of a salt-containing red powder of the following structure

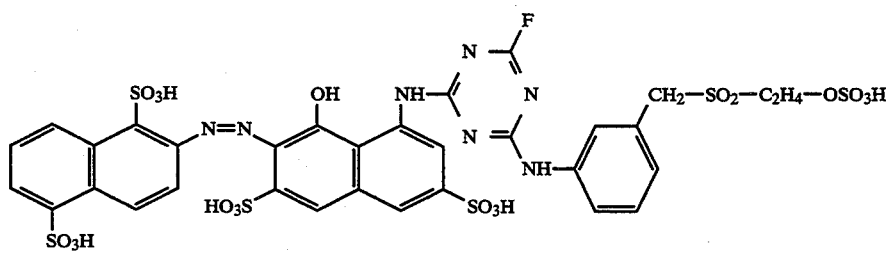

which dyes cotton by the dyeing and printing processes customary for reactive dyestuffs in red hues. ($\lambda_{max}$=517, 540 nm (H$_2$O)).

By varying the amine component in Example 1 and the coupling or diazo component in Example 2, further valuable red reactive dyestuffs can be obtained (see Table 1).

TABLE 1

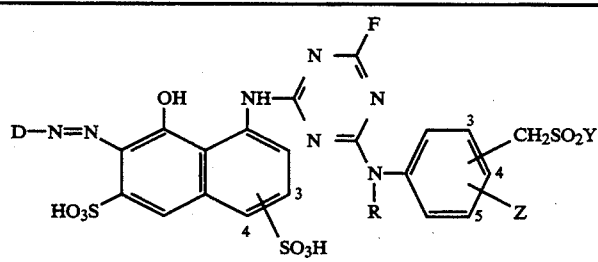

| Ex. | D | Position SO₃H | R | Z | CH₂SO₂Y |
|---|---|---|---|---|---|
| 3 | naphthalene-1,5-disulfonic acid (2-methyl) | 3 | H | H | 4-CH₂—SO₂—C₂H₄—OSO₃H |
| 4 | " | 3 | C₂H₅ | H | " |
| 5 | " | 3 | C₂H₅ | H | 3-CH₂—SO₂—C₂H₄—OSO₃H |
| 6 | " | 3 | H | 4-OCH₃ | " |
| 7 | " | 3 | H | 4-CH₃ | " |
| 8 | " | 3 | C₂H₅ | 4-OCH₃ | " |
| 8a | " | 3 | C₂H₅ | 4-CH₃ | " |
| 9 | naphthalene-1,5-disulfonic acid (2-methyl) | 4 | C₂H₅ | H | 3-CH₂—SO₂—C₂H₄—OSO₃H |
| 10 | " | 4 | H | H | " |
| 11 | " | 4 | H | H | 4-CH₂—SO₂—C₂H₄—OSO₃H |
| 12 | " | 4 | C₂H₅ | H | " |
| 13 | " | 3 | H | H | 4-CH₂—SO₂—CH=CH₂ |
| 14 | " | 3 | C₂H₅ | H | 4-CH₂—SO₂—CH=CH₂ |
| 15 | " | 3 | H | H | 3-CH₂—SO₂—CH=CH₂ |
| 16 | " | 3 | H | H | 3-CH₂—SO₂—C₂H₄—Cl |
| 17 | naphthalene-2,6-disulfonic acid derivative | 3 | H | H | 3-CH₂—SO₂—C₂H₄—OSO₃H |
| 18 | " | 3 | H | H | 4-CH₂—SO₂—C₂H₄—OSO₃H |
| 19 | " | 3 | C₂H₅ | H | 3-CH₂—SO₂—C₂H₄—OSO₃H |
| 20 | naphthalene-2,6-disulfonic acid derivative | 4 | C₂H₅ | H | 3-CH₂—SO₂—C₂H₄—OSO₃H |
| 21 | naphthalene-1-sulfonic acid (2-methyl) | 3 | H | H | 3-CH₂—SO₂—C₂H₄—OSO₃H |
| 22 | " | 4 | H | H | " |
| 23 | " | 3 | C₂H₅ | H | " |
| 24 | " | 3 | C₂H₅ | H | 4-CH₂—SO₂—C₂H₄—OSO₃H |
| 25 | " | 3 | H | 4-OCH₃ | 3-CH₂—SO₂—C₂H₄—OSO₃H |

TABLE 1-continued

[Structure: Naphthalene core with OH, D-N=N- group at position adjacent, HO3S and SO3H substituents (positions 3 or 4 indicated), NH-linked triazine bearing F substituent, connected to N(R)-phenyl group with CH2SO2Y at position 3 or 4 and Z substituent at position 4 or 5]

| Ex. | D | Position SO₃H | R | Z | CH₂SO₂Y |
|---|---|---|---|---|---|
| 26 | 2-SO₃H-phenyl | 3 | H | H | " |
| 26a | " | 3 | H | 4-CH₃ | " |
| 27 | 2-SO₃H-phenyl | 3 | H | H | 4-CH₂—SO₂—C₂H₄—OSO₃H |
| 28 | " | 3 | C₂H₅ | H | " |
| 29 | " | 3 | CH₂CH₂CO₂H | H | " |
| 30 | " | 3 | C₂H₅ | H | 3-CH₂—SO₂—C₂H₄—OSO₃H |
| 31 | " | 4 | H | H | " |
| 32 | 2-SO₃H-5-CH₃-phenyl | 3 | H | H | " |
| 33 | " | 3 | C₂H₅ | H | " |
| 34 | " | 3 | H | H | 4-CH₂—SO₂—C₂H₄—OSO₃H |
| 34a | 2-methyl-1-SO₃H-naphthyl | 3 | H | H | 3-CH₂—SO₂—C₂H₄—OSO₃H |
| 34b | " | 3 | H | 4-CH₃ | " |
| 34c | " | 3 | C₂H₅ | 4-CH₃ | " |
| 34d | " | 3 | C₂H₅ | 4-OCH₃ | " |
| 35 | 2-SO₃H-5-CH₃O-phenyl | 3 | H | H | 4-CH₂—SO₂—C₂H₄—OSO₃H |
| 36 | 2-SO₃H-3-CH₃-4-NHCOCH₃-phenyl | 3 | H | H | 3-CH₂—SO₂—C₂H₄—OSO₃H |
| 37 | " | 3 | C₂H₅ | H | " |
| 38 | 4-methyl-phenyl-SO₂—C₂H₄—OSO₃H | 3 | H | H | 3-CH₂—SO₂—C₂H₄—OSO₃H |

TABLE 1-continued

Structure:
D—N=N— attached to naphthalene bearing OH, HO$_3$S, SO$_3$H, and NH— linked to triazine (with F) connected to N(R)—phenyl bearing CH$_2$SO$_2$Y (position 3 or 4) and Z (position 4 or 5), with position 3 marked on naphthalene.

| Ex. | D | Position SO$_3$H | R | Z | CH$_2$SO$_2$Y |
|---|---|---|---|---|---|
| 39 | (p-phenylene)–CH$_2$–SO$_2$–C$_2$H$_4$–OSO$_3$H | 3 | H | H | 4-CH$_2$—SO$_2$—C$_2$H$_4$—OSO$_3$H |
| 40 | " | 3 | C$_2$H$_5$ | H | " |
| 41 | (m-phenylene)–CH$_2$–SO$_2$–C$_2$H$_4$–OSO$_3$H | 3 | H | H | 3-CH$_2$—SO$_2$—C$_2$H$_4$—OSO$_3$H |
| 42 | (p-phenylene)–SO$_2$–C$_2$H$_4$–OSO$_3$H | 3 | H | H | 4-CH$_2$—SO$_2$—C$_2$H$_4$—OSO$_3$H |
| 43 | " | 3 | CH$_2$CH$_2$CO$_2$H | H | " |
| 44 | naphthalene with SO$_3$H and SO$_2$—C$_2$H$_4$—OSO$_3$H | 3 | H | H | 4-CH$_2$—SO$_2$—C$_2$H$_4$—OSO$_3$H |
| 45 | " | 2 | H | H | 3-CH$_2$—SO$_2$—C$_2$H$_4$—OSO$_3$H |
| 46 | " | 3 | C$_2$H$_5$ | H | " |
| 47 | " | 3 | C$_2$H$_5$ | H | 4-CH$_2$—SO$_2$—C$_2$H$_4$—OSO$_3$H |
| 48 | " | 4 | C$_2$H$_5$ | H | " |

Dyestuff Examples 2 to 48 are also available by the following synthesis sequence:

First, 0.1 mol of 4-amino-5-hydroxy-2,7 (or 1,7)-naphthalenedisulphonic acid is condensed with 0.11 mol of cyanuric fluoride at 0° C. and pH 4.0 to 4.5 in a known manner, and the monocondensation product is then reacted with 0.1 mol of the amine component in an increasing temperature range from 0° to 20° C. and at pH 4.0 to 6.5. pH control takes place by means of aqueous sodium carbonate solution or potassium bicarbonate solution. In the last step of the reaction sequence, suitable diazonium salts (0.1 mol) are then coupled to the biscondensation product at 10° to 20° C. and pH 6.5 to 7.5. Isolation of the dyestuffs is then carried out as described in Example 2.

Example 2 is repeated, using the corresponding N-(4-aminobenzoyl) derivatives instead of 4-amino-5-hydroxy-2,7 (or 1,7)-naphthalenedisulphonic acid, giving the following red dyestuffs:

EXAMPLE 49

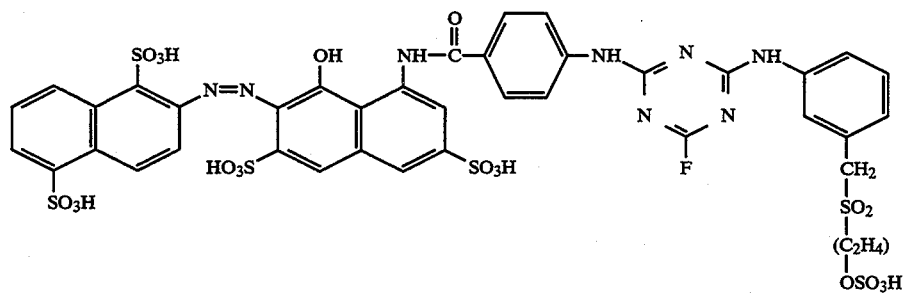

EXAMPLE 50

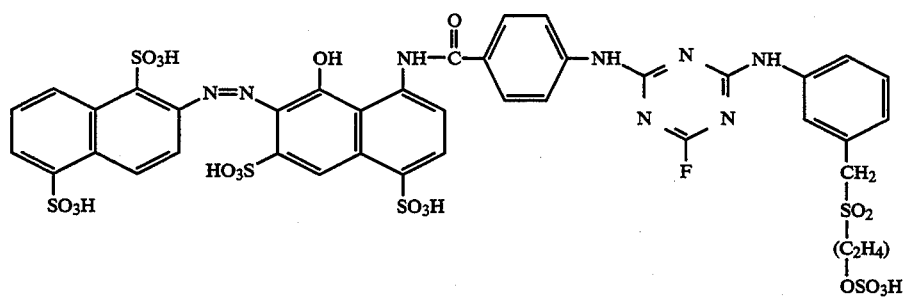

If the above variation is carried out with Example 26, likewise a valuable red reactive dyestuff is obtained.

EXAMPLE 51

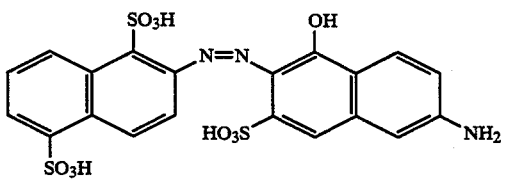

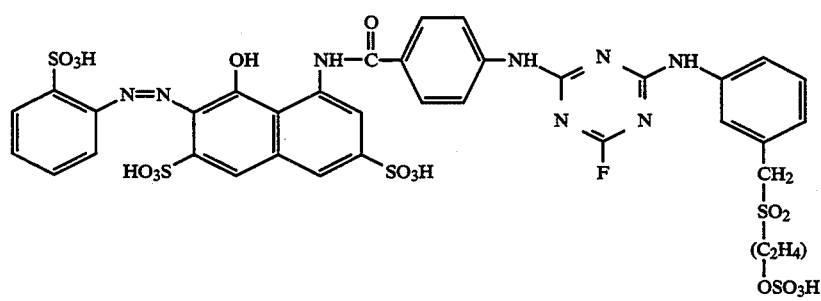

EXAMPLE 52

0.1 mol of the monoazo compound of the formula is dissolved under neutral conditions in 500 ml of water. The ice-cold condensation solution from Example 1 is added to this solution, and the pH is kept constant between 6.5 and 7.0 with 20% strength sodium carbonate solution. After stirring at 10° to 25° C. and pH 7.0 for about 6 hours, the dyestuff is precipitated by addition of common salt, isolated by suction filtration and dried, giving about 60 g of salt-containing red dyestuff powder which has the formula

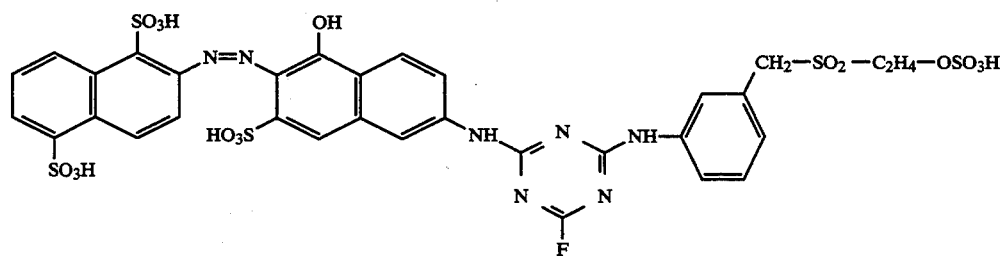

and dyes cotton in orange-red hues (485 nm). By varying the amine component in Example 1 and the coupling or diazo component in Example 52, further valuable orange and scarlet reactive dyestuffs can be obtained (Table 2).

TABLE 2

| Ex. | D | Position-NH | R | Z | —CH$_2$SO$_2$—Y |
|---|---|---|---|---|---|
| 53 | naphthalene with 1-SO$_3$H, 5-SO$_3$H (attached at 2) | 3 | H | H | 4-CH$_2$—SO$_2$—C$_2$H$_4$—OSO$_3$H |
| 54 | " | 3 | C$_2$H$_5$ | H | " |
| 55 | " | 3 | C$_2$H$_5$ | H | 3-CH$_2$—SO$_2$—C$_2$H$_4$—OSO$_3$H |
| 56 | " | 3 | H | 4-OCH$_3$ | " |
| 57 | " | 3 | H | 4-CH$_3$ | " |
| 58 | naphthalene with 1-SO$_3$H, 5-SO$_3$H (attached at 2) | 2 | H | H | 3-CH$_2$—SO$_2$—C$_2$H$_4$—OSO$_3$H |
| 59 | " | 2 | C$_2$H$_5$ | H | " |
| 60 | " | 2 | C$_2$H$_5$ | H | 4-CH$_2$SO$_2$—C$_2$H$_4$—OSO$_3$H |
| 61 | naphthalene with 1-SO$_3$H, 5-SO$_3$H (attached at 2) | 2 | H | H | 4-CH$_2$2—C$_2$H$_4$—OSO$_3$H |
| 62 | " | 2 | H | H | 4-CH$_2$SO$_2$—CH=CH$_2$ |
| 63 | " | 2 | H | H | 3-CH$_2$SO$_2$—CH=CH$_2$ |
| 64 | " | 4 | H | H | 3-CH$_2$SO$_2$—C$_2$H$_4$—OSO$_3$H |
| 65 | naphthalene with 1-SO$_3$H, 6-SO$_3$H (attached at 2) | 3 | H | H | " |

TABLE 2-continued

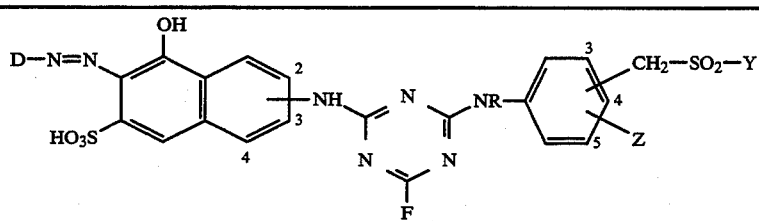

| Ex. | D | Position-NH | R | Z | —CH$_2$SO$_2$—Y |
|---|---|---|---|---|---|
| 66 | (naphthalene with 1-SO$_3$H, 5-SO$_3$H, 7-SO$_3$H) | 3 | H | H | " |
| 66a | " | 3 | C$_2$H$_5$ | H | " |
| 66b | " | 3 | H | 4-OCH$_3$ | " |
| 67 | (naphthalene with 1-SO$_3$H, 6-SO$_2$—C$_2$H$_4$—OSO$_3$H) | 2 | H | H | " |
| 68 | (naphthalene with 1-SO$_3$H, 6-SO$_2$—C$_2$H$_4$—OSO$_3$H) | 3 | H | H | 3-CH$_2$SO$_2$—C$_2$H$_4$—OSO$_3$H |
| 69 | " | 3 | H | H | 4-CH$_2$—SO$_2$—C$_2$H$_4$—OSO$_3$H |
| 70 | " | 3 | C$_2$H$_5$ | H | " |
| 71 | " | 2 | C$_2$H$_5$ | H | " |
| 72 | (naphthalene with 1-SO$_3$H, 5-SO$_2$—C$_2$H$_4$—OSO$_3$H) | 2 | H | H | " |
| 73 | (benzene with SO$_3$H) | 3 | H | H | 3-CH$_2$—SO$_2$—C$_2$H$_4$—OSO$_3$H |
| 74 | " | 3 | H | H | 4-CH$_2$—SO$_2$—C$_2$H$_4$—OSO$_3$H |
| 75 | (benzene with SO$_3$H, CH$_3$) | 3 | H | H | " |
| 76 | (benzene with SO$_3$H, CH$_3$, SO$_3$H) | 3 | H | H | 4-CH$_2$—SO$_2$—C$_2$H$_4$—OSO$_3$H |
| 77 | " | 3 | C$_2$H$_5$ | H | 3-CH$_2$—SO$_2$—CH=CH$_2$ |

TABLE 2-continued

Structure: D—N=N— attached to 1-hydroxy-2-amino-3-sulfonaphthalene (OH at 1, SO₃H at 3, positions 2, 3, 4 marked), with NH at position 3 connected to a triazine ring (with F substituent) which links via —NR— to a phenyl ring bearing —CH₂SO₂—Y at position 3 or 4 and Z at position 4 or 5.

| Ex. | D | Position-NH | R | Z | —CH₂SO₂—Y |
|---|---|---|---|---|---|
| 78 | 2-methyl-5-methoxy-benzenesulfonic acid (SO₃H, CH₃O on benzene) | 3 | H | H | 3-CH₂—SO₂—C₂H₄—OSO₂H |
| 78a | " | 3 | H | 4-OCH₃ | " |
| 78b | " | 3 | C₂H₅ | 4-OCH₃ | " |
| 78c | " | 3 | H | 4-CH₃ | " |
| 79 | " | 3 | H | H | 4-CH₂—SO₂—C₂H₄—OSO₂H |
| 80 | " | 3 | C₂H₅ | H | " |
| 81 | " | 3 | C₂H₅ | H | 3-CH₂—SO₂—C₂H₄—OSO₃H |
| 81a | " | 3 | C₂H₅ | 4-CH₃ | " |
| 82 | 2-methyl-5-methoxy-1,4-benzenedisulfonic acid (SO₃H, CH₃O, SO₃H) | 3 | H | H | 3-CH₂—SO₂—C₂H₄—OSO₃H |
| 83 | " | 3 | C₂H₅ | H | " |
| 83a | " | 3 | H | 4-CH₃ | " |
| 83b | " | 3 | H | 4-OCH₃ | " |
| 83c | " | 3 | C₂H₅ | 4-CH₃ | " |
| 83d | " | 3 | C₂H₅ | 4-OCH₃ | " |
| 84 | 2,5-dimethyl-1,4-benzenedisulfonic acid (SO₃H, CH₃, SO₃H) | 3 | H | H | 3-CH₂—SO₂—C₂H₄—OSO₃H |
| 85 | " | 3 | H | H | 4-CH₂—SO₂—C₂H₄—OSO₃H |
| 86 | 4-sulfophenylazo-2-methyl-5-sulfo-benzene (HO₃S—C₆H₄—N=N—C₆H₃(SO₃H)(CH₃)) | 3 | H | H | 4-CH₂—SO₂—C₂H₄—OSO₃H |
| 87 | " | 3 | H | H | 3-CH₂—SO₂—C₂H₄—OSO₃H |
| 88 | " | 3 | C₂H₅ | H | " |
| 88a | " | 3 | C₂H₅ | H | 4-CH₂—SO₂—C₂H₄—OSO₃H |
| 89 | 3-sulfophenylazo-2-methyl-5-sulfo-benzene (SO₃H, SO₃H isomer) | 3 | H | H | 3-CH₂—SO₂—C₂H₅—OSO₃H |
| 90 | " | 2 | H | H | " |

TABLE 2-continued

[Structure: Naphthalene with OH (position 1), D—N=N— at position 2, HO₃S at position 3, and at position 3 or 4 —NH— connected to triazine ring (with F substituent) —NR— phenyl ring with CH₂—SO₂—Y at position 3 and Z at position 4 or 5]

| Ex. | D | Position-NH | R | Z | —CH₂SO₂—Y |
|---|---|---|---|---|---|
| 91 | [2-sulfophenyl-N=N-4-methylphenyl with SO₃G at position 2 of second ring] | 3 | H | H | " |
| 92 | [2,5-disulfophenyl-N=N-4-methylphenyl with SO₃H] | 3 | H | H | " |
| 93 | [4-sulfophenyl-N=N-phenyl with SO₃H, CH₃ substituents] | 3 | H | H | 3-CH₂—SO₂—C₂H₅—OSO₃H |

Dyestuff Examples 52 to 93 are also available by the following synthesis sequence:

First, 0.1 mol of amino-4-hydroxy-2-naphthalenesulphonic acid is reacted with the condensation solution from Example 1 at 0° C. and pH 4.5. During the reaction time of about 3 hours, it is quite possible for the reaction temperature to rise to room temperature. At pH 6.5–7.5 (sodium carbonate solution), suitable diazonium salts (0.1 mol in each case) are then coupled onto the colourless biscondensation products. The dyestuffs are isolated by salting out and suction filtration.

Dyestuff mixtures, for example a mixture of Example 2 and 3, can be obtained by using in Example 1 a mixture of two isomers, i.e., 3- and 4-[(2-sulphatoethylsulphonyl)methyl]aniline instead of 3-[(2-sulphatoethylsulphonyl)methyl]aniline.

EXAMPLE 94

23.6 g of 7-amino-1,3-naphthalenedisulphonic acid monosodium salt are stirred in 150 ml of water/30 g of ice and 20 ml of concentrated hydrochloric acid, and an aqueous sodium nitrite solution is added dropwise at 5° to 10° C. After stirring at 5° to 10° C. for one hour, excess nitrous acid is removed with sulphamic acid.

This cream-coloured suspension is metered into a neutral solution of the coupling component prepared from 13.5 g of N-(3-aminophenyl)acetamide hydrochloride, 50 ml of water, 50 g of ice and about 30 ml of a 10% strength aqueous lithium hydroxide solution over a period of 30 minutes. During this addition, the pH of the reaction mixture is kept constant at 6.0 to 6.5 with 20% strength aqueous potassium bicarbonate solution at a maximum temperature of 10° C. After addition is complete, stirring is continued for 30 minutes, during which the pH is still kept constant.

Ice is now added to this orange-coloured coupling solution until a temperature of 0° C. is reached. 12 g of cyanuric fluoride are swiftly added, and the pH is simultaneously kept constant at 6.0 to 6.2 by addition of a 20% strength potassium bicarbonate solution. Condensation is complete after 10 minutes. A neutral solution of 21.5 g of 3-[(2-sulfatoethylsulfonyl)methyl]aniline in 100 ml of water is now slowly metered into this mixture while keeping the pH constant at 6.5 to 7.0 by addition of 20% strength sodium carbonate solution. The reaction mixture is then warmed to 20° C. over a period of 2 hours and with further pH control (6.5 to 7.0). Isolation and drying give 65 g of an orange-red powder ($\lambda_{max}$=389 nm (H₂O)) of the structure

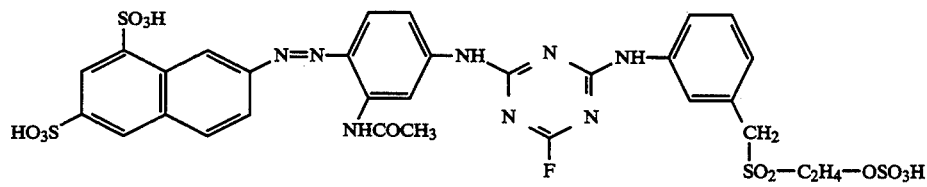

which dyes cotton in reddish yellow hues.

The same dyestuff is also obtained by first condensing 11 g of cyanuric fluoride with 21.5 g of 3-[(2-sulphatoethylsulphonyl)methyl]aniline in 150 ml of water/50 g of ice at 0° C. at a constant pH of 6.0, and reacting the resulting condensation product with the abovementioned coupling solution.

By varying the diazo component D-NH$_2$, the aniline coupling component containing A and B and the amino compound of the sulphonylmethyl structure, further valuable reactive dyestuffs of the formula

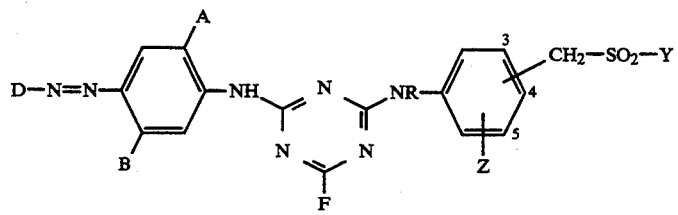

for example those of the table below, can be obtained analogously to Example 94.

Dyestuff mixtures, for example a mixture of Example 1 and 3, can be obtained by using in Example 1 a mixture of the two isomers, i.e., 3- and 4-[(2-sulphatoethylsulphonyl)methyl]aniline instead of 3-[(2-sulphatoethylsulphonyl)methyl]aniline.

| Ex. | D | B | A | R | Z | —CH$_2$—SO$_2$—Y |
|---|---|---|---|---|---|---|
| 95 | ![SO3H naphthalene HO3S] | NHCOCH$_3$ | H | C$_2$H$_5$ | H | 3-CH$_2$SO$_2$—C$_2$H$_4$—OSO$_3$H |
| 96 | " | " | H | H | H | 4-CH$_2$—SO$_2$—C$_2$H$_4$—OSO$_3$H |
| 97 | " | " | H | C$_2$H$_5$ | H | " |
| 98 | " | " | OCH$_3$ | C$_2$H$_5$ | H | " |
| 99 | " | NHCOCH$_2$OSO$_3$H | H | H | H | 3-CH$_2$—SO$_2$—CH=CH$_2$ |
| 100 | " | NHCOCH$_3$ | H | H | 4-OCH$_3$ | 3-CH$_2$SO$_2$—C$_2$H$_4$—OSO$_3$H |
| 101 | " | NHCONH$_2$ | H | C$_2$H$_5$ | H | " |
| 102 | " | CH$_3$ | H | H | H | 4-CH$_2$SO$_2$—C$_2$H$_4$—OSO$_3$H |
| 103 | " | H | OCH$_3$ | C$_2$H$_5$ | H | " |
| 104 | " | NHCOCH$_2$OH | H | H | 4-CH$_3$ | 3-CH$_2$SO$_2$—C$_2$H$_4$—OSO$_3$H |
| 105 | ![SO3H naphthalene SO3H] | NHCOCH$_3$ | H | H | H | 4-CH$_2$SO$_2$—C$_2$H$_4$—OSO$_3$H |
| 106 | " | " | H | C$_2$H$_5$ | H | " |
| 107 | " | " | H | C$_2$H$_5$ | 4-OCH$_3$ | 3-CH$_2$SO$_2$—C$_2$H$_4$—OSO$_3$H |
| 108 | " | " | H | H | H | " |
| 109 | " | OCH$_3$ | OCH$_3$ | H | H | " |
| 110 | " | NHCONH$_2$ | H | C$_2$H$_5$ | H | 3-CH$_2$SO$_2$—C$_2$H$_4$—OSO$_3$H |
| 111 | ![SO3H naphthalene HO3S SO3H] | NHCOCH$_3$ | H | H | H | 3-CH$_2$SO$_2$—C$_2$H$_4$—OSO$_3$H |
| 112 | " | " | H | H | 4-OCH$_3$ | " |
| 113 | " | " | H | C$_2$H$_5$ | H | " |
| 114 | " | " | H | H | H | 4-CH$_2$SO$_2$—C$_2$H$_4$—OSO$_3$H |

-continued

| Ex. | D | B | A | R | Z | —CH₂—SO₂—Y |
|---|---|---|---|---|---|---|
| 115 | 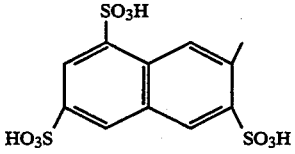 | NHCOCH₃ | H | C₂H₅ | H | 4-CH₂SO₂—C₂H₄—OSO₃H |
| 116 | " | NHCONH₂ | H | C₂H₅ | H | " |
| 117 | " | " | H | H | H | " |
| 118 | " | " | H | H | H | 3-CH₂SO₂—C₂H₄—OSO₃H |
| 119 | " | " | H | C₂H₅ | H | " |
| 120 | " | " | H | C₂H₅ | 4-OCH₃ | 3-CH₂—SO₂—CH=CH₂ |
| 121 | " | " | H | H | H | 3-CH₂SO₂—C₂H₄—OSO₃H |
| 122 | 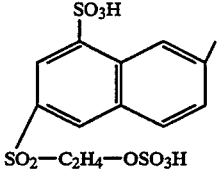 | NHCOCH₃ | H | C₂H₅ | H | 3-CH₂SO₂—C₂H₄—OSO₃H |
| 123 | " | NHCOCH₂OSO₃H | H | H | H | " |
| 124 | " | " | H | H | H | 4-CH₂SO₂—C₂H₄—OSO₃H |
| 125 | " | NHCO—C₂H₄—SO₃H | H | C₂H₅ | H | " |
| 126 | 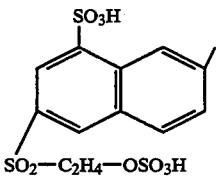 | OCH₃ | H | CH₂CH₂CO₂H | H | 4-CH₂SO₂—C₂H₄—OSO₃H |
| 127 | " | CH₂—SO₃H | H | H | H | " |
| 128 | 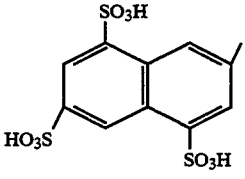 | NHCOCH₃ | H | H | H | 3-CH₂SO₂—C₂H₄—OSO₃H |
| 129 | " | " | H | C₂H₅ | H | " |
| 130 | " | " | H | H | H | 4-CH₂SO₂—C₂H₄—OSO₃H |
| 131 | " | NHCONH₂ | H | H | H | " |
| 132 | " | " | H | C₂H₅ | H | " |
| 133 | " | " | H | H | 4-OCH₃ | 3-CH₂SO₂—C₂H₄—OSO₃H |
| 134 | " | " | H | H | H | " |
| 135 | 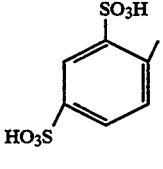 | NHCONH₂ | H | H | H | 3-CH₂SO₂—C₂H₄—OSO₃H |
| 136 | " | " | H | H | 4-OCH₃ | " |
| 137 | " | " | H | C₂H₅ | H | " |
| 138 | " | " | H | H | H | 4-CH₂SO₂—C₂H₄—OSO₃H |
| 139 | " | NHCOCH₃ | H | H | H | " |
| 140 | " | " | H | H | H | 3-CH₂SO₂—C₂H₄—OSO₃H |
| 141 | " | " | H | C₂H₅ | H | " |
| 142 | 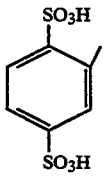 | NHCONH₂ | H | H | H | " |
| 143 | " | " | H | H | H | 4-CH₂SO₂—C₂H₄—OSO₃H |

-continued

| Ex. | D | B | A | R | Z | —CH$_2$—SO$_2$—Y |
|---|---|---|---|---|---|---|
| 144 | " | " | H | C$_2$H$_5$ | H | " |
| 145 | 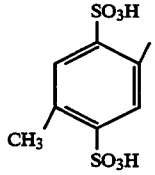 | NHCOCH$_3$ | H | H | H | 4-CH$_2$SO$_2$—C$_2$H$_4$—OSO$_3$H |
| 146 | " | " | H | H | H | 3-CH$_2$SO$_2$—C$_2$H$_4$—OSO$_3$H |
| 147 | " | NHCONH$_2$ | H | C$_2$H$_5$ | H | " |
| 148 | " | " | H | H | H | 4-CH$_2$SO$_2$—C$_2$H$_4$—OSO$_3$H |
| 149 | 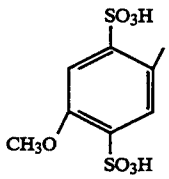 | NHCOCH$_3$ | H | H | H | 4-CH$_2$SO$_2$—C$_2$H$_4$—OSO$_3$H |
| 150 | " | " | H | H | H | 3-CH$_2$SO$_2$—C$_2$H$_4$—OSO$_3$H |
| 151 | " | NHCONH$_2$ | H | C$_2$H$_5$ | H | " |
| 152 | " | " | H | H | H | 4-CH$_2$SO$_2$—C$_2$H$_4$—OSO$_3$H |
| 153 | " | OCH$_3$ | OCH$_3$ | H | H | " |
| 154 | 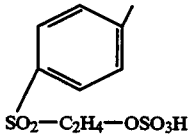 | NHCOCH$_2$OSO$_3$H | H | H | H | 3-CH$_2$SO$_2$—C$_2$H$_4$—OSO$_3$H |
| 155 | " | " | H | C$_2$H$_5$ | H | " |
| 156 | " | NHCOCH$_2$CH$_2$SO$_3$H | H | H | H | 4-CH$_2$SO$_2$—C$_2$H$_4$—OSO$_3$H |
| 157 | " | CH$_2$SO$_3$H | H | C$_2$H$_5$ | H | " |
| 158 | 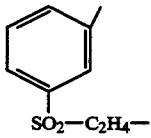 | NHCOCH$_2$OSO$_3$H | H | H | H | 4-CH$_2$SO$_2$—C$_2$H$_4$—OSO$_3$H |
| 159 | " | " | H | H | H | 3-CH$_2$SO$_2$—C$_2$H$_4$—OSO$_3$H |
| 160 | 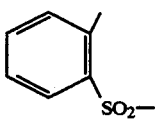 | " | H | H | H | " |
| 161 | 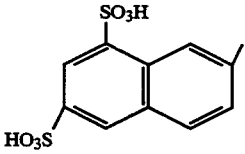 | NHCOCH$_3$ | H | H | 4-CH$_3$ | " |
| 162 | 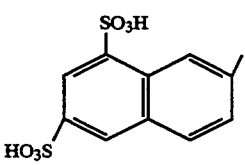 | NHCOCH$_3$ | H | C$_2$H$_5$ | 4-OCH$_3$ | 3-CH$_2$SO$_2$—C$_2$H$_4$—OSO$_3$H |
| 163 | " | NHCOCH$_3$ | H | C$_2$H$_5$ | 4-CH$_3$ | " |

-continued

| Ex. | D | B | A | R | Z | —CH₂—SO₂—Y |
|---|---|---|---|---|---|---|
| 164 | (naphthalene with SO₃H at 1, HO₃S at position) | NHCONH₂ | H | H | H | 3-CH₂—SO₂—C₂H₄—OSO₃H |
| 165 | (naphthalene with SO₃H at 1 and SO₃H) | NHCOCH₃ | H | H | 4-CH₃ | 3-CH₂—SO₂—C₂H₄—OSO₃H |
| 166 | " | " | H | H | 4-OCH₃ | 3-CH₂—SO₂—C₂H₄—OSO₃H |
| 167 | " | " | H | C₂H₅ | H | 4-CH₂—SO₂—C₂H₄—OSO₃H |
| 168 | " | " | H | C₂H₅ | 4-CH₃ | 3-CH₂—SO₂—C₂H₄—OSO₃H |
| 169 | (naphthalene with SO₃H, HO₃S, SO₃H) | NHCOCH₃ | H | H | 4-CH₃ | 3-CH₂—SO₂—C₂H₄—OSO₃H |
| 170 | " | NHCOCH₃ | H | C₂H₅ | 4-CH₃ | " |
| 171 | " | NHCOCH₃ | H | C₂H₅ | 4-OCH₃ | 3-CH₂—SO₂—C₂H₄—OSO₃H |
| 172 | " | NHCONH₂ | H | H | 4-CH₃ | 3-CH₂—SO₂—C₂H₄—OSO₃H |
| 173 | " | " | H | H | 4-OCH₃ | 3-CH₂—SO₂—C₂H₄—OSO₃H |
| 174 | " | " | H | C₂H₅ | 4-OCH₃ | 3-CH₂—SO₂—C₂H₄—OSO₃H |
| 175 | (benzene with SO₃H, HO₃S) | NHCONH₂ | H | C₂H₅ | H | 4-CH₂—SO₂—C₂H₄—OSO₃H |
| 176 | (benzene with SO₃H, HO₃S) | NHCONH₂ | H | C₂H₅ | 4-CH₃ | 3-CH₂—SO₂—C₂H₄—OSO₃H |
| 177 | " | NHCONH₂ | H | C₂H₅ | 4-OCH₃ | 3-CH₂—SO₂—C₂H₄—OSO₃H |
| 178 | " | NHCONH₂ | H | H | 4-CH₃ | 3-CH₂—SO₂—C₂H₄—OSO₃H |
| 179 | " | NHCONH₂ | H | H | 4-OCH₃ | 3-CH₂—SO₂—C₂H₄—OSO₃H |
| 180 | " | NHCOCH₃ | H | C₂H₅ | H | 4-CH₂—SO₂—C₂H₄—OSO₃H |
| 181 | " | NHCOCH₃ | H | C₂H₅ | 4-CH₃ | 3-CH₂—SO₂—C₂H₄—OSO₃H |
| 182 | " | NHCOCH₃ | H | C₂H₅ | 4-OCH₃ | 3-CH₂—SO₂—C₂H₅—OSO₃H |
| 183 | " | NHCOCH₃ | H | H | 4-CH₃ | 3-CH₂—SO₂—C₂H₅—OSO₃H |
| 184 | " | NHCOCH₃ | H | H | 4-OCH₃ | 3-CH₂—SO₂—C₂H₅—OSO₃H |

The table examples are characterised by the following $\lambda_{max}$ values (H₂O):

| Example | nm |
|---|---|
| 3 | 518, 540 |
| 4 | 518, 540 |
| 7 | 519, 540 |
| 8 | 518, 540 |
| 21 | 521, 545 |
| 34a | 521, 544 |
| 44 | 519, 540 |
| 53 | 486 |
| 54 | 486 |
| 56 | 485 |
| 66 | 483 |
| 66a | 482 |
| 66b | 483 |
| 78 | 502 |
| 78b | 501 |
| 78c | 502 |
| 79 | 503 |
| 80 | 501 |
| 82 | 497 |
| 86 | 513 |
| 87 | 514 |
| 88a | 512 |
| 95 | 389 |
| 96 | 390 |
| 97 | 389 |
| 100 | 389 |
| 105 | 388 |
| 106 | 388 |

-continued

| Example | nm |
|---------|-----|
| 107 | 388 |
| 108 | 387 |
| 111 | 397 |
| 112 | 399 |
| 113 | 397 |
| 114 | 396 |
| 115 | 400 |
| 116 | 416 |
| 117 | 416 |
| 118 | 416 |
| 119 | 416 |
| 120 | 418 |
| 135 | 388 |
| 136 | 389 |
| 137 | 388 |
| 138 | 388 |
| 147 | 390 |
| 148 | 390 |
| 151 | 407 |
| 152 | 407 |
| 172 | 397 |
| 165 | 388 |
| 166 | 388 |
| 167 | 388 |
| 171 | 399 |
| 173 | 417 |
| 174 | 418 |
| 175 | 388 |
| 177 | 388 |
| 179 | 389 |

We claim:

1. Reactive dyestuff which, as the free acid, has the formula

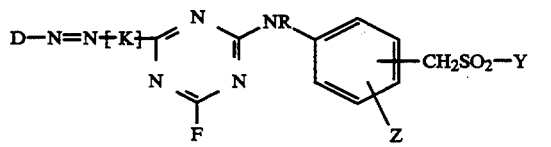

in which
K is

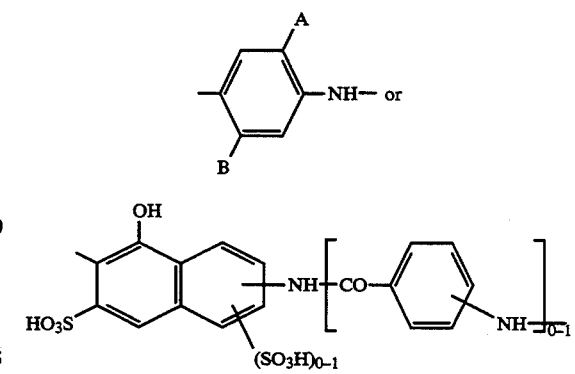

the bonding to the triazinyl radical taking place in each case via the amino function of K, Y denotes $CH=CH_2$, $CH_2CH_2OSO_3H$ or $CH_2CH_2Cl$, R denotes H or $C_1$-$C_3$-alkyl, which may be substituted by OH, $CO_2H$ or CN, Z denotes H, $C_1$-$C_4$-alkyl or $C_1$-$C_4$-alkoxy, D denotes a phenyl or naphthyl radical substituted by $SO_3H$, $CO_2H$, $CH_2$—$SO_2W$, $SO_2W$, $NH$-$COCH_3$, $C_1$-$C_4$-alkyl and/or $C_1$-$C_4$-alkoxy, W having one of the meanings given under Y, or denotes a radical of the structure

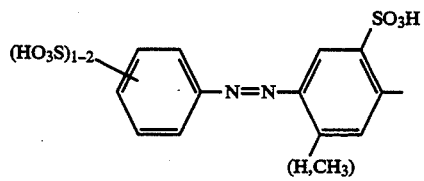

A denotes H, $C_1$-$C_4$-alkyl or $C_1$-$C_4$-alkoxy,

B denotes H, $C_1$-$C_4$-alkyl, halogen, $C_1$-$C_4$-alkoxy, —OH, $SO_3H$— or $OSO_3H$-substituted $C_1$-$C_4$-alkyl, $NHCONH_2$, NHCO-(-$C_1$-$C_4$-alkyl), $NHCOCH_2OSO_3H$, NHCO-(—$CH_2$—)$_{1-3}SO_3H$, $NHCOCH_2OH$ or NHCO-(—O-$C_1$-$C_4$-alkyl).

2. Reactive dyestuff according to claim 1, of the formula

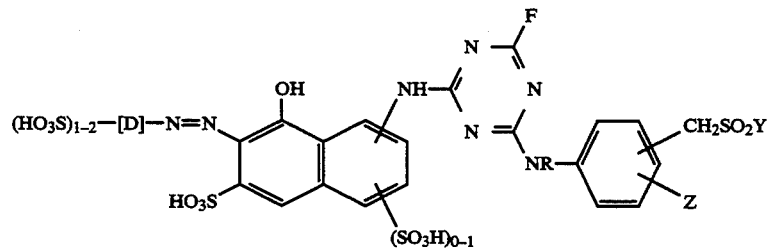

or

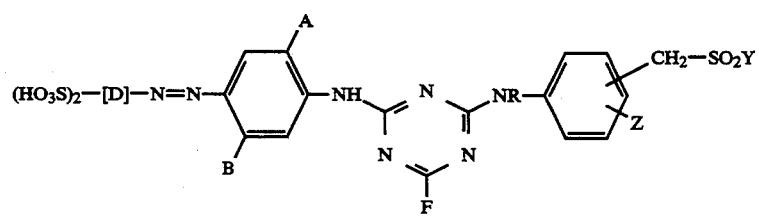

in which

R, Y, A, B and Z have the meaning given in claim 1, and the phenyl or naphthyl radical D can be additionally substituted by $C_1$-$C_4$-alkyl, $C_1$-$C_4$-alkoxy, NHCOCH$_3$, CH$_2$SO$_2$W or SO$_2$W, W having one of the meanings given under Y.

3. Reactive dyestuff according to claim 1 of one of the following formulae in which X is H, CH$_3$, OCH$_3$, OC$_2$H$_5$, CH$_2$SO$_2$W or SO$_2$W, and in which the remaining substituents have the meaning given in claim 1.

4. Reactive dyestuff according to claim 1 of one of the following formulae

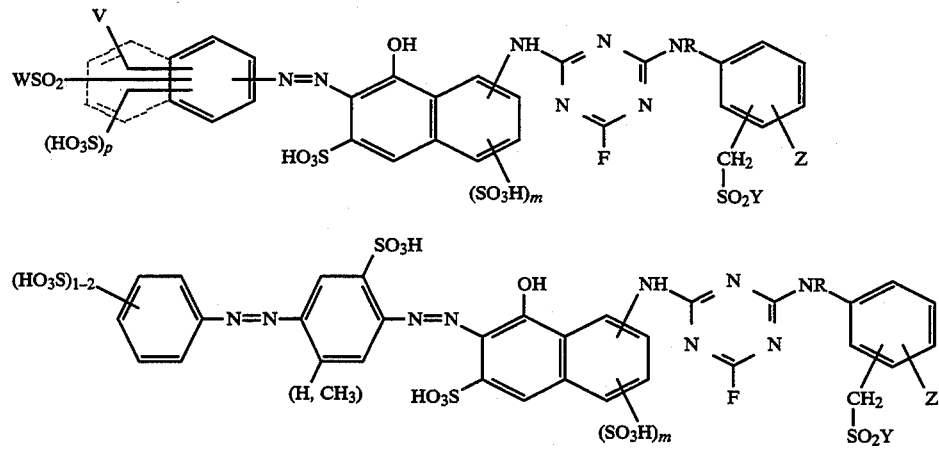

in which

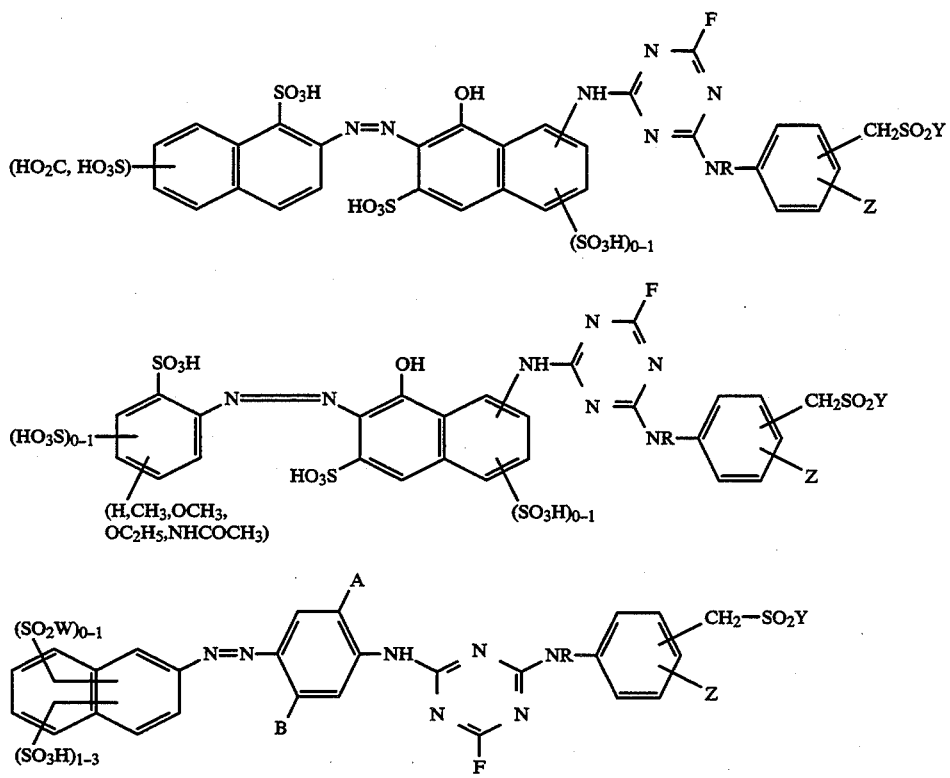

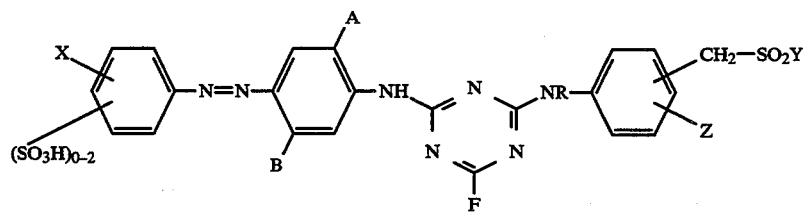

V denotes H, CH$_3$, OCH$_3$, OC$_2$H$_5$ or NHAcyl, in particular NH—CO—CH$_3$,
p,m, independently of one another, denote 0 or 1,
R denotes H or C$_2$H$_5$,
W,Y, independently of one another, denote CH=CH$_2$ or CH$_2$CH$_2$OSO$_3$H, and
Z denotes H, CH$_3$ or OCH$_3$.

5. Reactive dyestuff according to claim 1, characterised in that
A is H,

B is CH$_3$, OCH$_3$, NHCOCH$_2$, NHCONH$_2$ or NHCOCH$_2$OSO$_3$H,
R is H or C$_2$H$_5$,
W and Y, independently of one another, are CH=CH$_2$ or CH$_2$CH$_2$OSO$_3$H and
Z is H, CH$_3$ or OCH$_3$.

6. Reactive dyestuff according to claim 1 of the formula

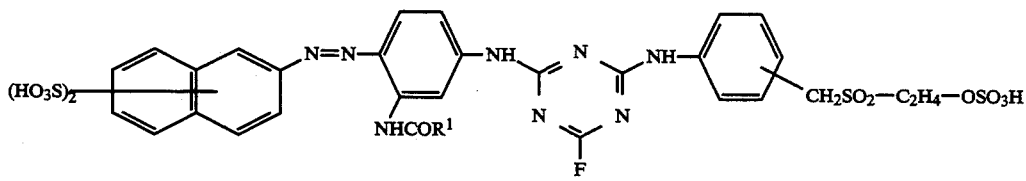

where
R$^1$ is CH$_3$ or NH$_2$.

7. Reactive dyestuff according to claim 1 of one of the following formulae

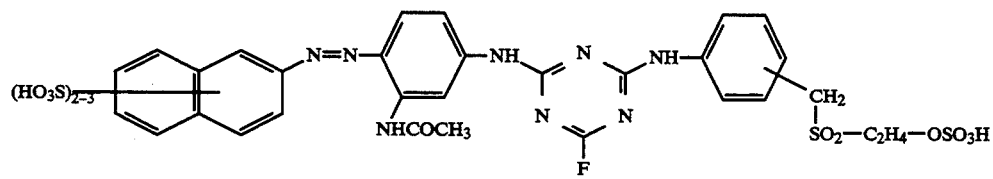

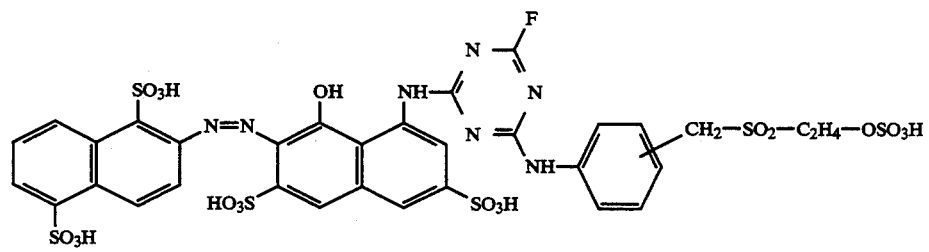

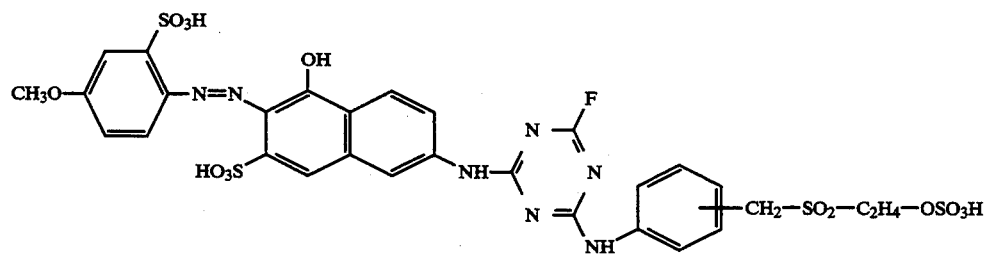

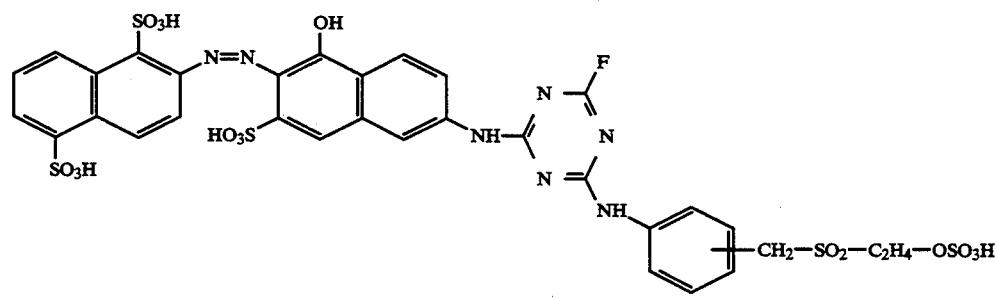

-continued
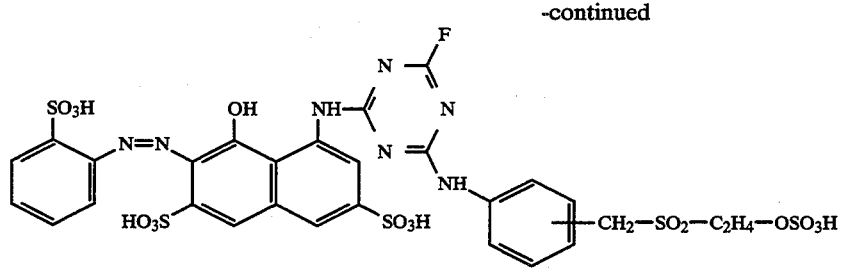
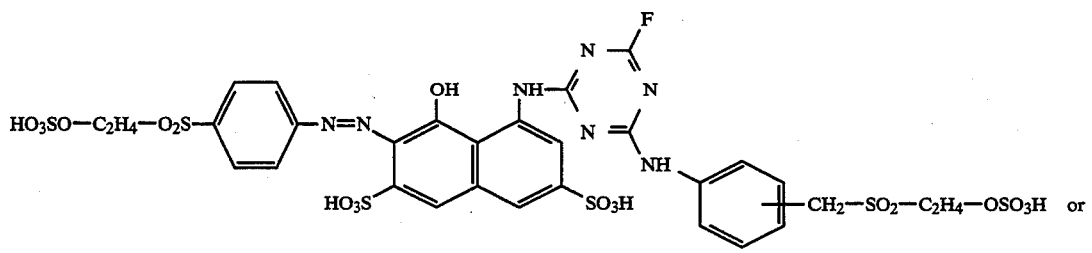
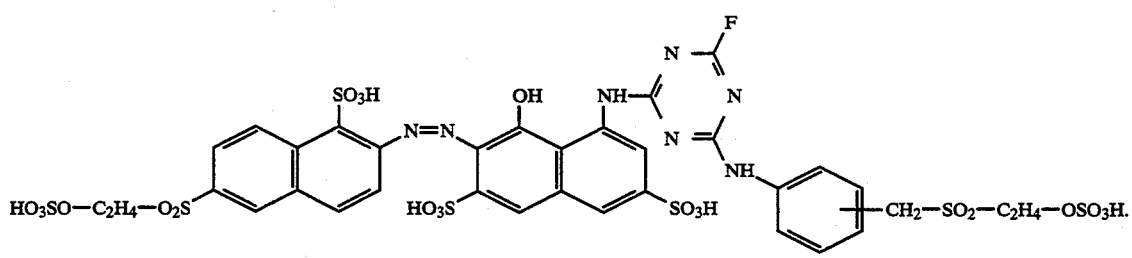
8. Process for the dyeing or printing of natural and synthetic OH- and/or amido-containing materials, in which a dye is applied to the material or incorporated in the material and fixed, if appropriate in the heat and/or in the presence of an acid-binding agent, characterised in that the dyestuff used is a dyestuff according to claim 1.
* * * * *

UNITED STATES PATENT AND TRADEMARK OFFICE
CERTIFICATE OF CORRECTION

PATENT NO. : 5,428,141
DATED : June 27, 1995
INVENTOR(S) : Herd, et al.

It is certified that error appears in the above-indentified patent and that said Letters Patent is hereby corrected as shown below:

Col. 42, line 1   Delete " $NHCOCH_2$ " and substitute -- $NHCOCH_3$ --

Signed and Sealed this

Third Day of October, 1995

Attest:

BRUCE LEHMAN

Attesting Officer        Commissioner of Patents and Trademarks